United States Patent
Price et al.

(10) Patent No.: US 7,124,403 B2
(45) Date of Patent: Oct. 17, 2006

(54) METHODS AND APPARATUS FOR MANAGING DEFUNCT PROCESSES

(75) Inventors: Daniel Price, Mountain View, CA (US); Roger Faulkner, Rockford, MI (US)

(73) Assignee: Sun Microsystems, Inc., Santa Clara, CA (US)

( * ) Notice: Subject to any disclaimer, the term of this patent is extended or adjusted under 35 U.S.C. 154(b) by 671 days.

(21) Appl. No.: 09/930,807

(22) Filed: Aug. 15, 2001

(65) Prior Publication Data

US 2003/0037290 A1    Feb. 20, 2003

(51) Int. Cl.
*G06F 9/44* (2006.01)

(52) U.S. Cl. .................. 717/127; 717/126; 717/131

(58) Field of Classification Search ........ 717/124–133, 717/134, 149, 110–111, 162, 120–121; 718/102
See application file for complete search history.

(56) References Cited

U.S. PATENT DOCUMENTS

| | | | |
|---|---|---|---|
| 4,945,468 A * | 7/1990 | Carson et al. ............... | 713/200 |
| 5,485,409 A * | 1/1996 | Gupta et al. ................ | 713/200 |
| 6,002,870 A | 12/1999 | Faulkner et al. | |
| 2002/0133529 A1 * | 9/2002 | Schmidt ..................... | 709/102 |

FOREIGN PATENT DOCUMENTS

EP    1284456 A3    2/2006

OTHER PUBLICATIONS

Cruz, "Linux Kernel: Problem with interfaces and ioctl", [http://seclists.org/lists/linux-kernel/2001/Aug/0197.html, ]Aug. 1, 2001.*
John W. Eaton, "Re: zombie "Is, [http://www.octave.org/octave-lists/archive/help-octave. 1996/msg00261.html], Dec. 1, 1996.*
Powell et al., "SunOS Multi-thread Architecture", Sun Microsystems Inc, USENIX, Winter 1991.*
Zabatta et al., "A Thread Performance Comparison-Windows NT and Solaris on A Symmetric Multiprocessor", USENIX, Aug. 1998.*
Silberschatz et al., "Operating System Concepts—Module 21: The Unix System", http://www.cse.ucsc.edu/, pp. 1-31, 1999.*
Randolph Herber, "UNIX System V (Concepts)", http://www-cdf.fnal.gov/, pp. 1-3, 1997.*
John Bell II, "Zombie processes, and What to do about them . . . ", http://www.kclug.org/old_archives/linux-activists/1993/, pp.: 1-2, Feb. 13, 1993.*
Ritchie et al., "The UNIX Time-Sharing System", ACM, pp.: 365-375, Jul. 1974.*

(Continued)

*Primary Examiner*—Ted T. Vo
(74) *Attorney, Agent, or Firm*—Beyer Weaver & Thomas, LLP (57) ABSTRACT

The present invention relates to managing defunct processes. A parent process that does not collect exit information associated with a child process may leave a defunct child process. A defunct child process is identified. The parent process of the defunct child process is modified. The parent process can be modified by changing an existing thread or instantiating a new thread to collect exit information associated with the child process. Collecting exit information causes the removal of the defunct child process.

18 Claims, 8 Drawing Sheets

OTHER PUBLICATIONS

Stas Bekman, "Performance/Avoiding Zombie Processes", website printout from http://thingy.kcilink.com/modperlqguide/performance/Avoiding_Zombie_Procsses, Apr. 27, 2001, 4 pages.

Sydney S. Weinstein, "Zombie Processes", website printout from http://caissa.odn.state.oh.us/sa/htmfiles/0201/x0059_we.htm, 1996, 3 pages.

EP Application No. EP 02 25 5618, Search Report dated Dec. 20, 2005.

Werner Almesberger, "proc/nzombies" Google Search, XP-002355188, Mar. 3, 2000.

Lew Pitcher, "zombie", Google Search, XP-002355189, Sep. 13, 2000.

Vern Hoxie, "Kill a zombie process?," Google Search, XP-002355296, Apr. 11, 1996.

Sun Microsystems, "Sun Announces Solaris 9 Operating Environment: With over 300 New Features, Customers Save Money and Time," News release, XP-002355297, May 22, 2002.

Sun Microsystems, "Solaris 9 Reference Manual Collection," XP-002355298, May 22, 2002.

* cited by examiner

;# METHODS AND APPARATUS FOR MANAGING DEFUNCT PROCESSES

BACKGROUND OF THE INVENTION

1. Field of Invention

The present invention relates generally to managing defunct processes. More particularly, the present invention relates to modifying processes to reap defunct child processes.

2. Description of the Related Art

Conventional operating systems provide mechanisms for a parent process to create a child process to perform various tasks. For example, in UNIX based operating systems, a parent process associated with a web server program can create a child process to handle an incoming content request. When the child process finishes handling the incoming content request, the operating system performs cleanup on the child process to release resources used by the child process. The operating system then typically notifies the parent that the child process has finished. The operating system, however, can not remove all resources associated with the child process. Exit information associated with the child process remains for consumption by the parent process. During conventional operation, the parent process waits for exit information associated with the child process so that the parent process can acquire exit information associated with the tasks performed by the child. In one example, the parent process can obtain information about whether or the child process terminated normally after completing a task or if the child process was terminated abruptly by the operating system.

In order to acquire exit information, conventional operating systems specify that the parent process be designed to make an explicit call to wait for the exit information associated with the child process. Collecting the exit information associated with the child process is referred to herein as reaping the child process. Generally, a parent process that implements the timely collection of exit information from its child process is referred to herein as a attentive parent process. If the parent process is not interested in the exit information, conventional operating systems specify that the parent process be designed to make an explicit call not to wait for the exit information. Generally, a parent process that signals that it will not collect the exit information of child process is referred to herein as a disinterested parent process. The operating system will not publish exit information to the disinterested parent, and defunct processes will not result.

However, because of various reasons such as faulty design or software bugs, parent processes often fail to make an explicit call to wait or not to wait for the exit information. That is, the parent is neither attentive nor disinterested. Generally, a parent that fails to indicate that it will not collect exit information and fails to collect exit information is referred to herein as a negligent parent process. If the parent process is negligent, the exit information of the child process remains indefinitely. A terminated child process associated with exit information that remains indefinitely is referred to herein as a defunct process or a zombie process.

Conventional operating systems provide no techniques for eliminating the defunct child process without terminating the parent process that created the child process. Defunct child processes negatively impact system operation in a variety of manners. Although defunct child processes use only a small amount of memory, they do consume finite system resources. Faulty software code that results in a single defunct child process may very well lead to many defunct child processes consuming a large amount of resources. In many UNIX based operating systems, processes including defunct child processes are retained in a process table of finite size. A large number of zombie processes can consume many of the process table slots and prevent the creation of new processes. A large number of defunct child processes can also cause a large amount of worry amongst system administrators, as defunct processes may create the impression that the system is operating improperly.

Only very limited solutions exist currently for eliminating defunct processes. One solution is to terminate the parent process that created the defunct child process. In conventional UNIX and UNIX-like environments, every process other than the init process has a parent process. Terminating a parent process which has child processes causes the operating system to modify the parent-child relationship of all child processes of the parent process. Each child's parent relationship is modified such that the init process is made the parent of the child process. The init process is programmed to collect exit information from all of its children as they exit. When the child processes exit, the exit information is collected, and the operating system can completely dispose of the child processes. However, terminating the parent process to reap defunct child processes disrupts system operation, since the parent process may be engaged in useful work. For example, terminating a parent process associated with a web server program to reap a defunct child process can temporarily take an entire web site off-line. Furthermore, if the defunct child process is the result of faulty software code, the defunct processes will likely result again after the restart of the parent process. Another very limited solution is to restart the entire system. However, rebooting the system is an even more disruptive technique for eliminating defunct child processes than terminating the parent process.

Accordingly, improved techniques for managing defunct processes are desirable.

SUMMARY OF THE INVENTION

The present invention relates to managing defunct processes. A parent process that does not collect exit information associated with a child process may leave a defunct child process. A defunct child process is identified. The parent process of the defunct child process is modified. The parent process can be modified by changing an existing thread or instantiating a new thread to collect exit information associated with the child process. Collecting exit information causes the removal of the defunct child process.

In one embodiment, a computer-implemented method for a running parent process to collect exit information from a child process is provided. A parent process associated with a defunct child process is identified. The parent process associated with the defunct child process is modified. Modifying the parent process allows the parent process to collect exit information associated with the defunct child process.

The parent process can be modified by co-opting a thread associated with the parent process. The parent process can also be modified by creating an agent thread inside the parent process to collect exit information associated with the defunct process. A control criterion can be used to determine whether to modify the parent process.

According to another embodiment, a computer-implemented method for reaping a defunct child process associated with a parent process is provided. A defunct child process is identified. An agent thread is attached to a parent process to allow modification of the parent process, wherein the parent process is modified to reap the defunct child process.

In another embodiment, an apparatus for reaping a defunct child process associated with a parent process is provided. The apparatus comprises memory and a processor. The processor, coupled to memory, is configured to identify a defunct child process and attach an agent thread to a parent process to allow modification of the parent process. The parent process is modified to reap the defunct child process.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF THE EMBODIMENTS

A defunct child process results when the associated parent process fails to handle the exit information of a child process when the child process terminates. The child process may terminate for a variety of reasons. For example, a child process may terminate after a task has been completed, a certain period of time has elapsed, the child process is terminated by the operating system, the child process is terminated by a user or administrator, or the child process is terminated by faulty coding.

The operating system performs cleanup operations to release resources held by the child process. However, exit information associated with the terminated child process remains after the cleanup operations. Exit information may include the exit status of the child process and the statistical data. The exit information is provided to the parent process so that the parent process can obtain information about how the tasks were performed by the child process. If the parent process does not make an explicit call to wait or not wait for exit information, i.e. the parent process is negligent, the defunct child process remains.

The present invention provides techniques for managing and eliminating defunct child processes. In one embodiment, a running parent process is modified dynamically so that the parent process waits for the exit information associated with the defunct child process. The running parent process can be modified by attaching an agent thread to the parent process. In one example, a thread is attached to the parent process and the thread is configured to collect exit information associated with the defunct child process. In another example, an existing thread associated with the parent process can be modified to collect exit information associated with the defunct child process. After the exit information is collected, the defunct child process is removed from the system.

Figure 1:
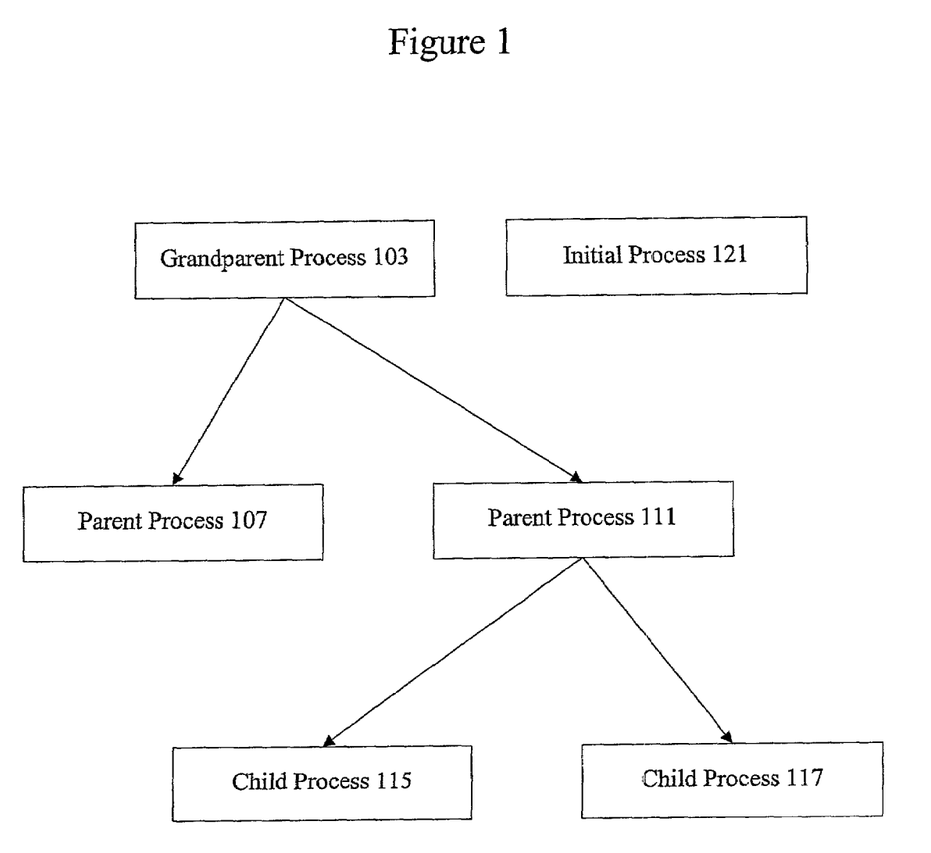
FIG. 1 is a diagrammatic representation of a system architecture that can use the techniques of the present invention.

FIG. 1 is a diagrammatic representation of an architecture that can use the techniques of the present invention. The architecture shown in FIG. 1 can be implemented in a variety of environments such as UNIX based operating systems and UNIX variants, and POSIX (ANSI/IEEE 1003.1) environments.

Grandparent process 103 has two children, parent processes 107 and 111. A parent process 107 has no children. Parent process 111 has child processes 117 and 115. A parent process 111 may create a child process 117 if the parent process 111 has to perform a task expected to take a relatively significant amount of time. A parent process may also create a child process to implement a logically distinct part of a problem solution, or the parent may wish to have fault isolation from the child process in the event the child process were to crash. Alternatively, a parent process 111 may create a child process 117 if the parent process 111 wants to be able to handle multiple tasks concurrently. Child process 117 can then function in parallel with the parent process 111 and with child process 115. In one example, a parent process 111 is associated with a web server handling requests from a number of clients. A web server may receive multiple requests from clients concurrently. Handling multiple requests at the same time could be accomplished by creating a child process to handle each new request.

As will be appreciated by one of skill in the art, a program such as a web server may comprise one or more processes. Each process may create additional child processes. According to various embodiments, a parent process 111 can synchronously wait for a child process to complete. In other embodiments, the parent process 111 continues processing and waits at a later time for the child process to complete. If a child process 117 terminates before the parent process 111, the parent process typically makes a call to wait for the exit information of the child process 117. Otherwise, the exit information remains and the child process 117 remains a defunct child process 117 that is not removed from the system.

If the parent process 111 terminates before the child process 117, the child process 117 gets a new parent. The child process 117 is adopted by an initial process 121. One of the functions of the initial process 121 is to continually collect exit information associated with adopted child processes.

Figure 2:
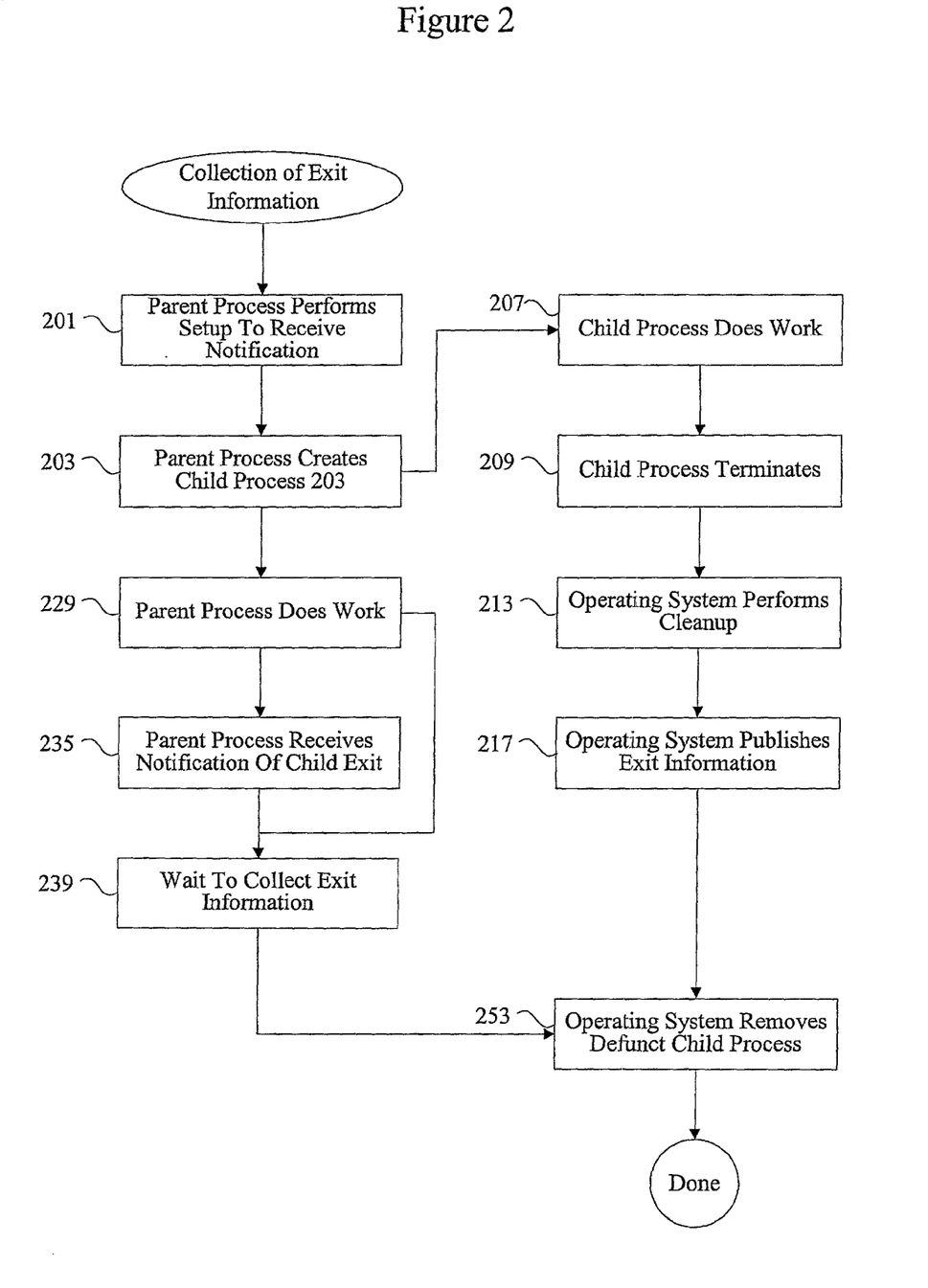
FIG. 2 is a process flow diagram showing the collection of exit information for an attentive parent process.

FIG. 2 is a process flow diagram providing more detail on the collection of exit information. At 201, the parent process can be configured configured to receive notification of the termination of a child process at 201. At 203, a parent process creates a child process using a function call such as fork( ). The child process proceeds to perform various tasks at 207. The child process is then terminated at 209. The child process can be terminated at 209 for a variety of reasons. As noted above, the child process may be terminated because of faulty source code, completion of a task, or a user initiated exit operation. The operating system performs cleanup to retrieve resources used by the child process at 213. The operating system then publishes exit information including the exit status associated with the child process at 217. At this point, the child process is a defunct or a zombie process.

In UNIX and UNIX-variant environments, a program can interact with its environment via various inter-process messages such as 'signals'. Typically, system administrators use the 'kill' command to send signals to processes for various purposes. Signals may also be sent to a process by the operating system to indicate a change in external state, or to signal that the process has encountered an unexpected fault or problem. Signals may be synchronous or asynchronous depending on the semantic meaning of the specific signal being sent. For example, signals play a role in the collection of exit information from child processes. In one example, the operating system arranges for the SIGCHLD signal to be sent asynchronously to a process to indicate that one of its child processes has exited. The parent process is configured to determine which of its child processes has exited and collects the exit information associated with that process.

A common misconception is that mechanisms typically used to terminate processes will also be effective when applied to defunct processes. A common way in which a system administrator terminates a process in the UNIX environment is via the 'kill' command. This command sends a signal to the victim process and the operating system examines the victim process. If the victim process is defunct, the signal is discarded, since the victim process has already been partially destroyed, and can no longer respond to signals. This makes defunct or zombie processes "unkillable", leading to frequent complaints by system administrators.

In UNIX based operating systems, defunct processes can be identified using the ps command. Defunct processes cannot be eliminated using commands such as the kill command in various flavors of UNIX because defunct process have already exited. Commands such as the kill command send signals to a process to exit. Although the defunct process has already exited, exit information remains on the system until it is collected.

While the child process is performing tasks at 207, the parent process may be performing processing as well at 229. In one embodiment, the parent process then waits to collect the exit information associated with the child at 239. In another embodiment, the parent process only waits for exit information after it has received notification at 235 that a child process has terminated. The parent process can then wait to collect the exit information associated with the child at 239. Waiting for a child process to complete and collecting the associated exit information can be accomplished with a call to a collector function. Any function called to reap a defunct child process is referred to herein as a collector function. A collector function can be a program function call or a system call to wait( ) or waitpid( ) in various operating systems. After the exit information associated with the child process is collected, the operating system completely eliminates the defunct child process at 219.

According to other embodiments, a parent process may simply be disinterested. A conventional way to express disinterest of a child is to change the "action" associated with the signal SIGCHLD in the parent process. In one example of a UNIX environment, disinterest can be indicated using the sigaction( ) function, passing it SIGCHLD (the signal whose action we wish to affect) and SA_NOCLDWAIT, a special value indicating that the parent process will not be waiting for its children.

The child process can be adopted by an initial process, such as the init process in various UNIX environments. Any process configured to adopt child processes associated with terminated parents is herein referred to as an initial process. The init process in UNIX environments typically has a process ID of 1. Conventionally, the init process becomes the new parent of the defunct child process. The init process itself is not modified. If the init process adopts a child process which is defunct, it receives a SIGCHLD signal, which includes notification about which process has exited.

However, faulty software code may cause a parent process to be negligent. Furthermore, the parent process may be one of the processes of a program that runs continuously without termination.

Parent processes that ignore the exit information of child processes leave defunct processes. When defunct processes persist, the only conventional technique to reap defunct processes is to terminate the parent process. According to various embodiments, when the parent process is terminated, the child process is adopted by an initial process such as an init process. The process ID of the child process can be conveyed to the initial process to identify the child process. The initial process, however, is not modified. The initial process is only passed the identity of the child process. The init process is then responsible for reaping the child process. As will be appreciated by one of skill in the art, terminating the parent process can be very disruptive to normal system operation.

The techniques of the present invention enable elimination of the defunct child process without terminating the parent process. Reaping the defunct child process is possible even when a nonterminated parent process is negligent. As noted above, a parent process may be negligent because of faulty software code. According to various embodiments, the negligent parent process is modified. The techniques of the present invention allow dynamic correction of a failure to collect exit information even when the parent process remains nonterminated. In other words, techniques of the present invention compensate for the failure of a parent process to specify waiting or not waiting by directing a process to wait or not wait for exit information.

Figure 3:
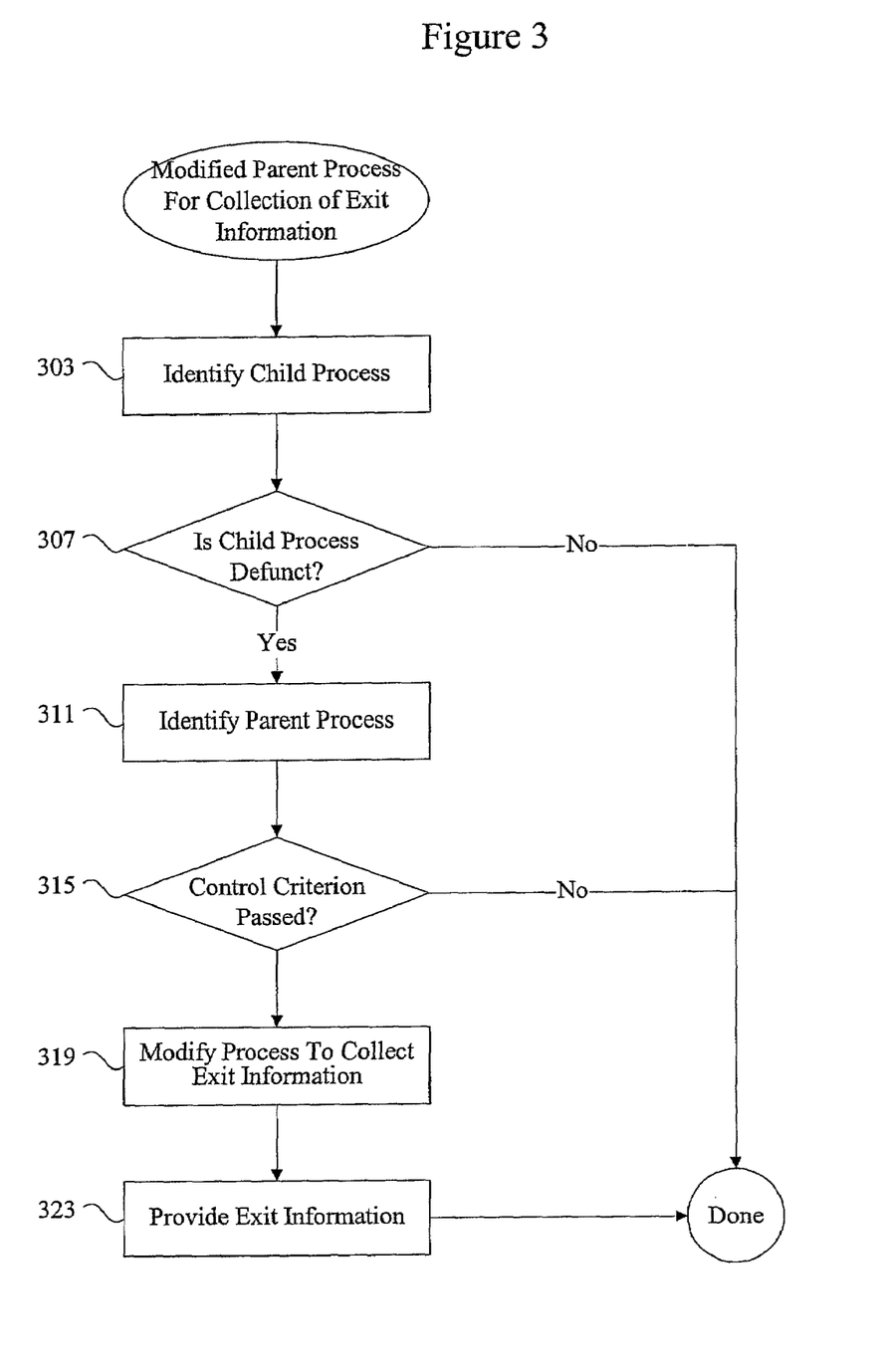
FIG. 3 is a process flow diagram showing the collection of exit information for a negligent parent process.

FIG. 3 is a process flow diagram showing the collection of exit information when the parent process ignores the child process. At 303, the child process is identified. Identifying the child process may include determining the process ID. At 307, it is determined if the child process is defunct. If the child process is not defunct, no further action is necessary at 309. If the child process is defunct at 307, the identity of the corresponding parent process is determined at 311. At 315, a control criterion can be used to determine whether or not a child process should be reaped. Although control criteria can be used to more accurately select what child processes should be reaped, using control criteria is not necessary in any given embodiment of the present invention. In one example, a control criterion is passed if the defunct child process has been defunct for more than one minute. Control criteria are discussed in more detail below.

The parent process is then modified so that the parent process will collect exit information associated with the child process at 319. As noted above, the parent process can continue running while the exit information of the child process is collected. The parent process remains nonterminated and system operation can continue uninterrupted.

It should be noted that the process described with reference to FIG. 3 can be a user implemented UNIX script or the process may be a utility that is automatically run after a certain number of defunct processes are detected. In one embodiment, the process of FIG. 3 can be run periodically to manage defunct processes after the number of defunct processes exceeds a user specified number, or it may be run when process table slots are running low. The techniques of the present invention can also be used upon a user's determination that defunct processes exist on a system. Reaping defunct child processes can be applied in a variety of situations.

After a process is modified to reap the child process at 319, exit information can be provided to output at 323. The exit information can be provided to a display or automatically written to a database or log file. The exit information can be used for aid in debugging various processes.

Figure 4A:
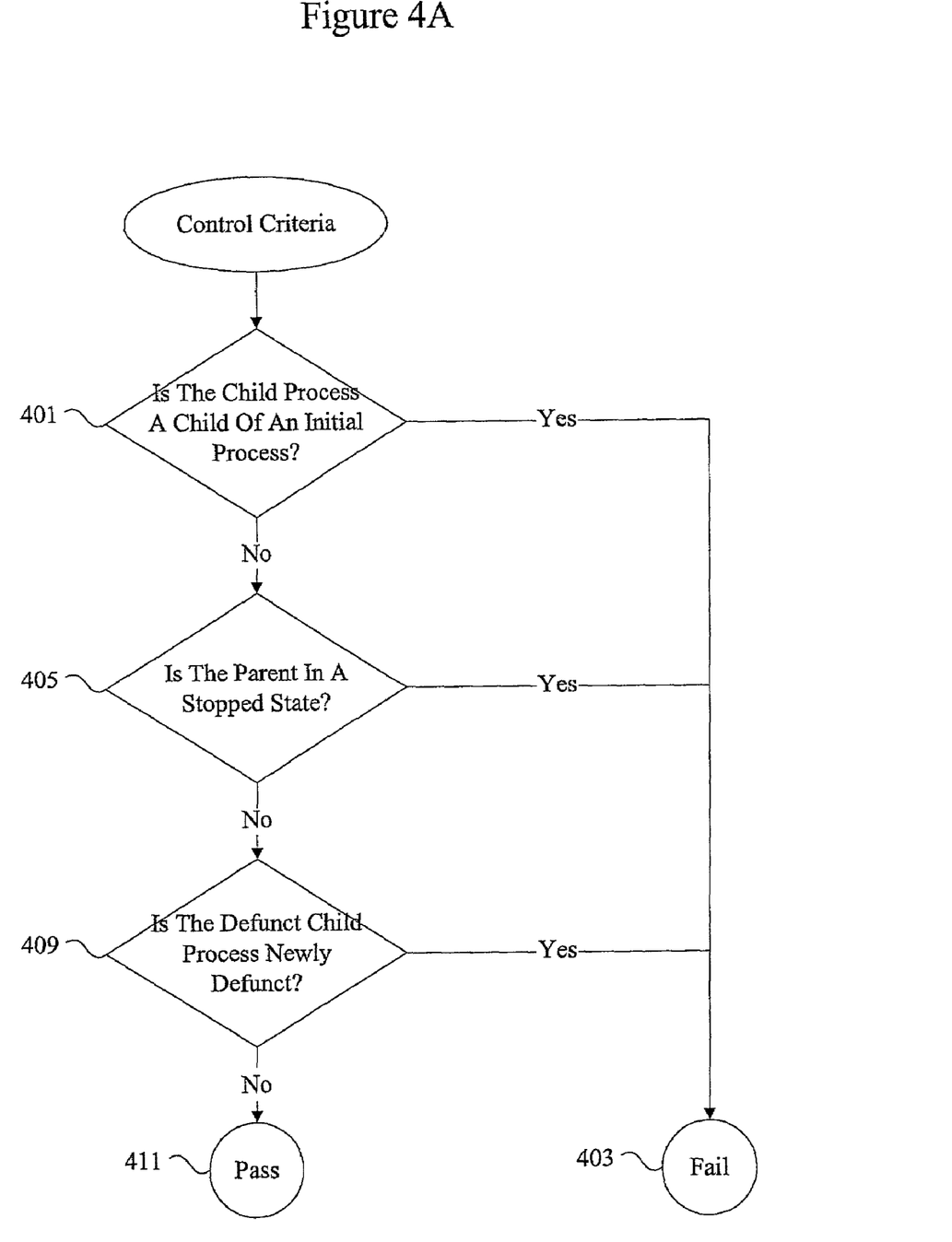
FIG. 4A is a process flow diagram showing control criteria for determining whether a defunct child process should be reaped.

FIG. 4A is a process flow diagram showing control criteria for determining whether a defunct child process should be reaped. Any number of control criterion can be used. In one embodiment, three control criteria must pass before a process is modified to reap the defunct child process. In the embodiment shown in FIG. 4, the control criteria are passed if the child process is not a child of the initial process, the parent is not in a stopped state, and the defunct child process is not be newly defunct. It is determined at 401 whether the defunct child process is a child of an initial process. The initial process may be the parent of several defunct child processes. As noted above, one of the primary functions of the initial process is to periodically reap any of its defunct child processes. A control criterion is passed if the child process is not a child of the initial process. A test applied to determine whether a child process should be reaped is referred to herein as a control criterion.

At 405, another control criterion is passed if it is determined that the parent has not stopped running. A stopped parent process as used herein is distinct from a terminated parent process. A stopped parent process may result from a debugging event affecting the parent process, such as the activation of a breakpoint, watchpoint, or an explicit directive to stop instruction execution by a debugging agent. A stopped process may also result as part of the operating system's process model semantics. For example, in some UNIX environments, a process may be stopped administratively for "job control". When a process is stopped, none of its streams of instruction execution, such as threads or light weight processes are active. A stopped process is distinct from a terminated process in that a stopped process may be set running again. A terminated process has reached a final state, and is not eligible to run again in the future. A terminated process may reach a final state due to a completion of its tasks, suffering a fatal error, or as the result of administrative intervention to "kill" the process. For a stopped process, asynchronous events such as signals, are queued until the process is set running again. Thus a stopped parent process will not "miss" notification of one of its children exiting. A process may stop itself, but only an external agent, such as the operating system or another process can set the process running again.

If the parent process is stopped at 405, when its execution is resumed, it may attempt to reap the associated defunct child process. Hence, a stopped process does not indicate that a child process will be ignored indefinitely. Instead, it is likely that the parent process will await exit information associated with the child process when set running again.

Prematurely reaping a defunct child process may negatively impact system operation. If a defunct child process is reaped prematurely, and later a parent process exits a stopped state and makes a call to wait for exit information corresponding to the already reaped child process, the parent process may stall or receive an error notification. The parent process may be unable to continue correct operation without the already collected exit information. Control criteria allowing a more accurate determination of when to reap defunct child processes can be used to prevent adversely impacting parent processes. In one example, a parent process may be performing mathematical functions and may have created a child process to calculate Fast Fourier Transforms. The parent process may not be able to complete its mathematical operations until it collects exit information associated with the child process.

Another control criterion that can be used is a determination of whether or the defunct child process is a newly defunct child process at 409. If the defunct child process is a newly defunct process, it is likely that a parent process has not yet been able to collect exit information associated with the child. The operating system may have just recently published the exit information of the now defunct child process. By not intervening on parent with newly defunct child processes, the parent process is allowed time to collect exit information. It should be appreciated that the amount of time that a defunct child process is considered "newly defunct," can be widely varied based on the needs of a particular system (which will typically be governed primarily by system characteristics and predicted performance). Time periods can vary from a few seconds to a few days. By way of example, a period of one minute works well in certain situations. Time information can be obtained from the exit information associated with child process. As noted above, the exit information provides details on how the process was terminated, what resources were used, and when the process was terminated. Information on when the process was terminated combined with present timing information allows a determination of whether a child processes newly defunct.

As will be appreciated by one of skill in the art, other control criteria can be used as well. In one example, a child process may be reaped only after it is determined that the parent process has not been stopped for some designated period of time (e.g., within the last minute). A parent process may have just recently changed from a stopped state. A period of time could be provided to allow the parent process to reap any defunct child processes after the parent process leaves the stopped state. According to still other embodiments, a control criterion may specify that a defunct child process should be reaped only if the associated parent process is not a critical system process.

Control criteria can be used to more safely reap defunct child processes. As noted above, prematurely reaping defunct processes can adversely impact system operation. Control criteria can be used to lessen the risk that system operation will be negatively affected. According to various embodiments, after control criteria are passed, a parent process is modified to reap the associated defunct child process.

It should be noted that control criteria can be implemented both inside and outside of the parent process. Some control criteria, such as determining whether a parent process is stopped, may necessarily have to be implemented outside of the parent process. Other control criteria can be implemented either inside or outside of the parent, depending on factors such as the scope and complexity.

A process can be modified to reap a defunct child process in a variety of manners. In one embodiment, a process is modified by co-opting a thread associated with the parent process. A variety of techniques for co-opting threads are used in conventional debugging programs, as will be appreciated by one of skill in the art. In another embodiment, a process is modified by attaching an agent thread to the parent process. Attaching an agent thread is described in U.S. Pat. No. 6,002,870 titled Method and Apparatus For Nondamaging Process Debugging Via An Agent Thread, the entirety of which is incorporated by reference for all purposes. It should be noted that entities referred to herein as threads may also be referred to as light weight processes in various embodiments.

Figure 4B:
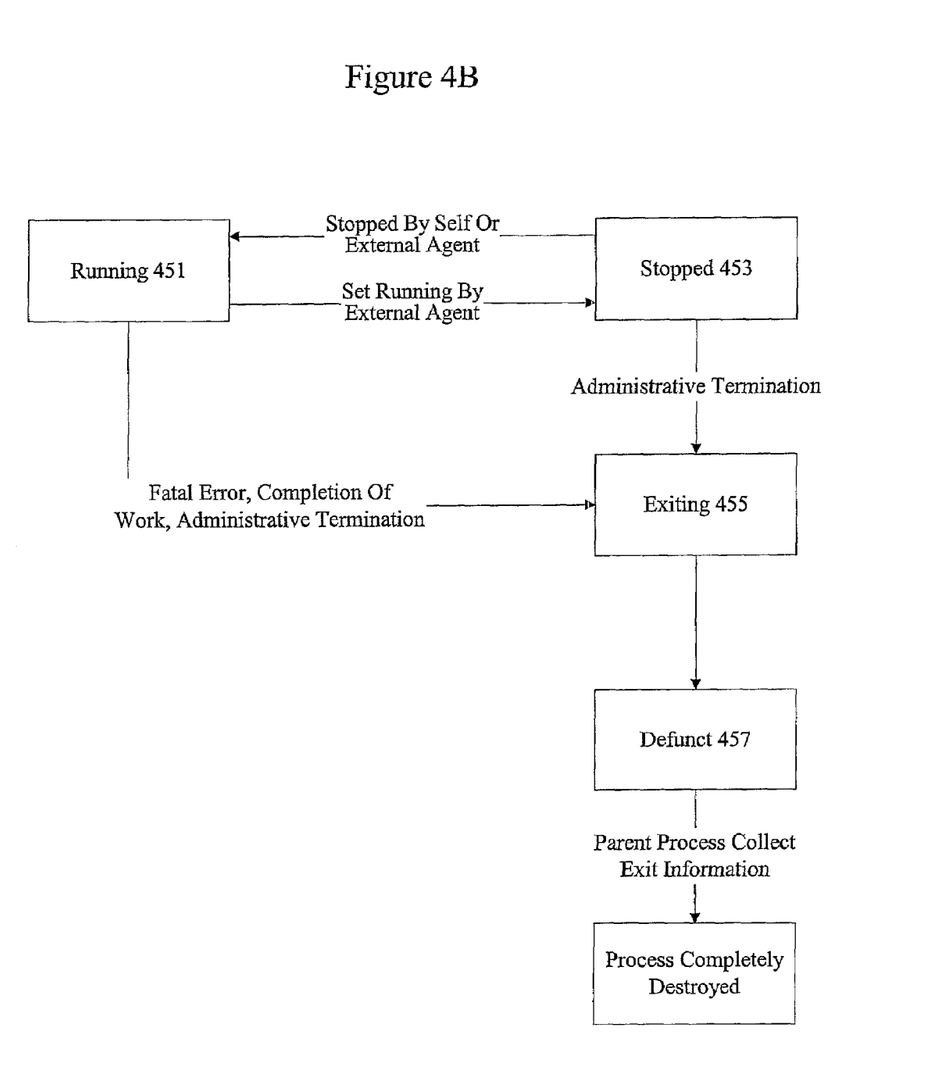
FIG. 4B is a state diagram representation showing various process states and transitions.

FIG. 4B is a state diagram representation showing various process states and transitions. According to various embodiments, process in the running state 451 can transition to the stopped state 453 either by an internal signal or an external agent as noted above. The stopped process can start to run again by an external agent. A process in the running state 451 can transition to the exiting state 455 from occurrences such as fatal errors, completion of work, or administrative termination. The exited process then transitions from the exited state 455 to the defunct state 457. A process transitions from the defunct state 457 to the process completely destroyed state 459 after a parent process collects the exit information.

Figure 5:
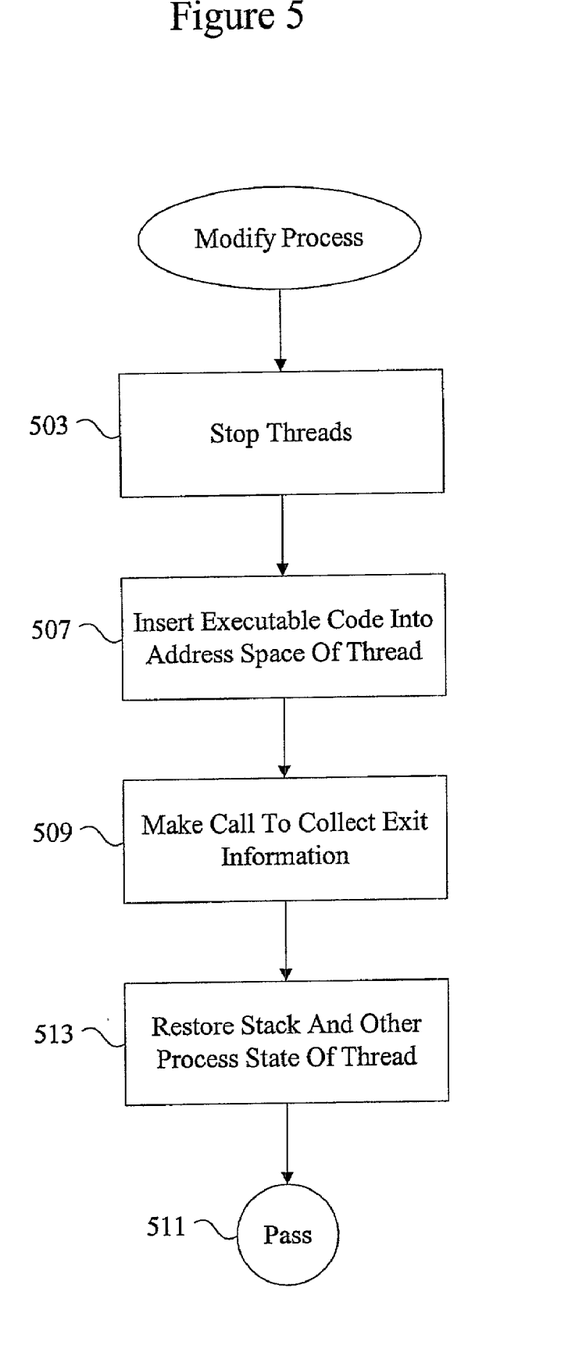
FIG. 5 is a process flow diagram showing the reaping of a defunct child process.

FIG. 5 is a process flow diagram showing the modification of a process. At 503, all of the threads associated with the process are stopped. Executable code can be inserted into the address space associated with the parent process at 507. The executable code can invoke a call to collect exit information associated with the child thread at 509. According to various embodiments, the executable code includes function calls such as wait( ) or waitpid( ). Executable code can be inserted by placing an activation record on the stack of the thread. The program counter of the thread can then be pointed to any desired code sequence. As soon as the co-opted thread completes operation, the thread can be returned to normal operation by restoring the stack associated with the thread at 513. As will be appreciated by one of skill in the art, co-opting threads can impair operation of the parent process and cause unexpected side effects.

Figure 6:
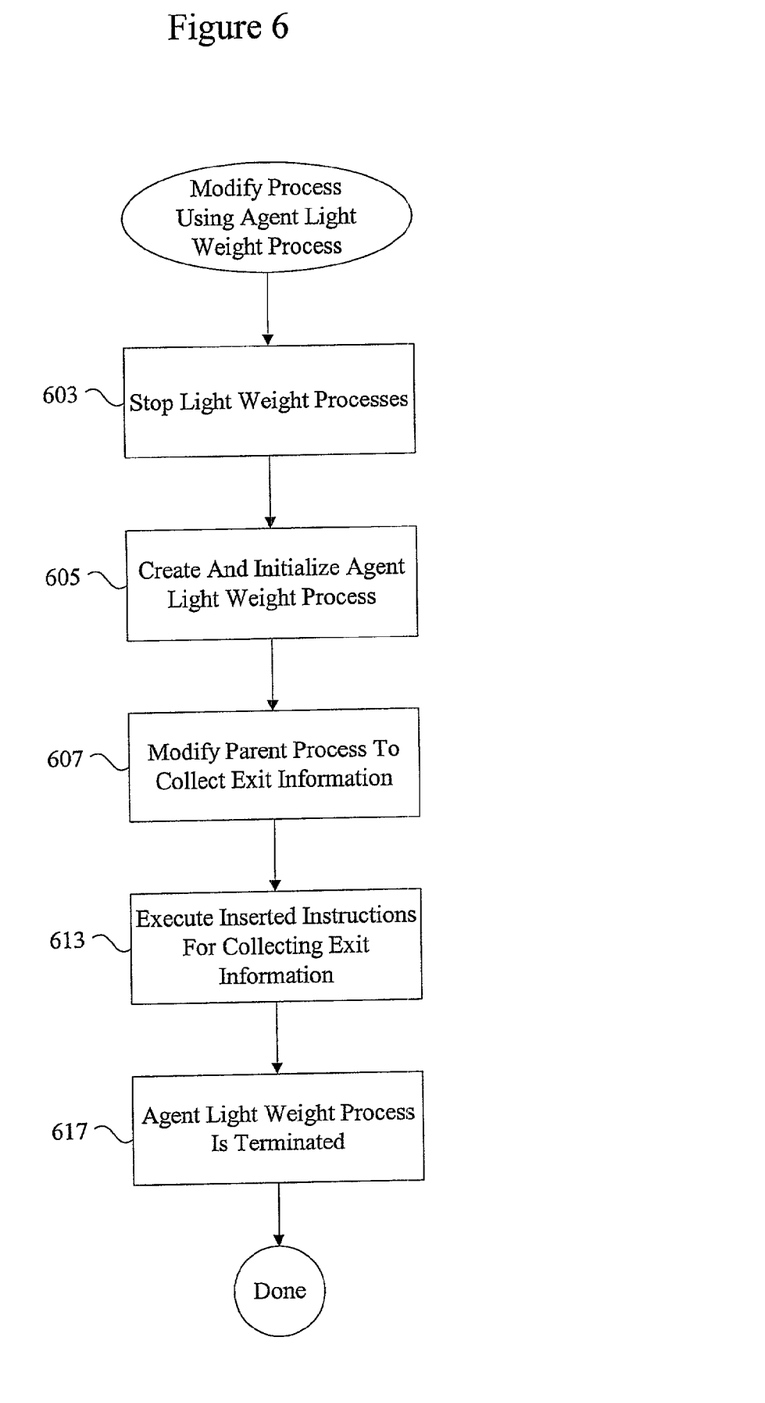
FIG. 6 is a process flow diagram showing the modification of a parent process using agent threads.

Another technique for modifying a process to collect exit information is shown in FIG. 6. FIG. 6 is a process flow diagram showing the modification of a process using agent threads. The technique described in FIG. 6 provides a new type of thread that allows modification of a parent process without co-opting any of the target programs existing threads. Instead, an agent thread is used to cause the parent process to execute explicit calls to collect exit information associated with child processes. Agent threads limit the risk that normal operation of the parent program will be impaired.

At 603, all threads associated with the parent process are stopped. As noted above, stopped processes can be resumed at a later time. At 605, an agent light weight process is created and initialized using parameters maintained by the operating system kernel. The parent process is then modified to collect exit information associated with a child process at 607. The modification of the parent process is described in U.S. Pat. No. 6,002,870 titled Method and Apparatus For Nondamaging Process Debugging Via An Agent Thread, the entirety of which is incorporated by reference for all purposes as noted above.

According to various embodiments, the agent thread is instantiated after causing a process such as a parent process to enter the stopped state. The agent thread is instantiated such that it too is initially stopped (i.e. not running). The agent's stack and register set can be modified such that appropriate variable values will be available to the program code when the agent is set running. For example, if the parent process is directed to call the wait system call for a particular child process, the Process ID of that child would be placed in the stack of the victim process. In this example, the program counter register (also called instruction pointer) of the agent thread is adjusted so that it will cause the wait system call to execute when set running.

The agent can also be configured to stop once it completes the operation of interest. All other light weight processes in the parent process can remain stopped. The agent light weight process is set running, and executes the appropriate program code inside the target process. Once the agent light weight process has stopped upon completion of this operation, the results of the operation are copied out of the victim process and examined. At this point the agent light weight process can be destroyed or directed to do other work. Once all such work is complete, the agent is destroyed, and the other light weight processes in the parent process are set running again.

According to various embodiments, a call to a collector function such as wait( ) is configured to collect exit information associated with any child process. According to another embodiment, an explicit call to a collector function such as waitpid( ) is configured to collect exit information of a specific child process identified using a process ID.

At 613, instructions for collecting exit information are executed. The last instruction associated with the agent thread can be an instruction that causes the agent thread to terminate at 617. As will be appreciated by one of skill in the art, the thread can be terminated by a function call to exit the thread.

The techniques of the present invention can also be contained in a basically autonomous agent injected into a misbehaving parent process. The agent remains resident inside of the parent process, waiting for children that become defunct and stay defunct for a long period of time. The agent can then automatically reaps the child processes on behalf of the "host" process.

Figure 7:
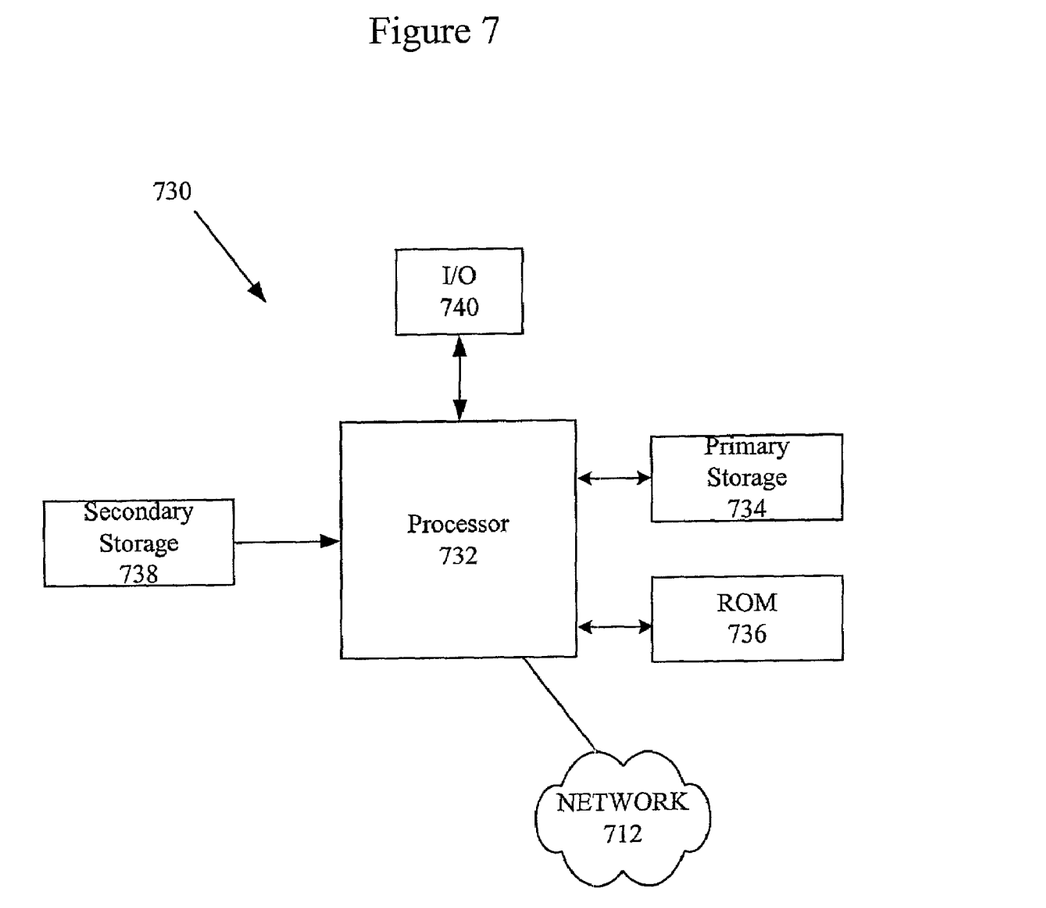
FIG. 7 is a diagrammatic representation showing a system that can be used to implement the present invention.

The techniques for modifying processes to collect exit information can generally be implemented on any suitable computing system. FIG. 7 illustrates a typical, general-purpose computer system suitable for implementing the present invention. The computer system 730 includes at least one processor 732 (also referred to as a central processing unit, or CPU) that is coupled to memory devices including primary storage devices 736 (typically a read only memory, or ROM) and primary storage devices 734 (typically a random access memory, or RAM).

As is well known in the art, ROM acts to transfer data and instructions uni-directionally to the CPUs 732, while RAM is used typically to transfer data and instructions in a bi-directional manner. CPUs 732 may generally include any number of processors. The CPUs 732 are involved in modifying processes, running control criteria, and collecting exit information. CPUs 732 can also perform analysis of defunct child processes, determine whether a child process is a child of an initial process, a parent is in a stopped state, or if a defunct child process is newly defunct. Both primary storage devices 734, 736 may include any suitable computer-readable media. A secondary storage medium 738, which is typically a mass memory device, is also coupled bi-directionally to CPUs 732 and provides additional data storage capacity. The secondary storage medium can hold executable code strings for insertion into the address space of a thread and can also contain information for creating and initializing an agent light weight process.

The mass memory device 738 is a computer-readable medium that may be used to store programs including computer code, data, and the like. Typically, mass memory device 738 is a storage medium such as a hard disk, a tape, an optical disk, a floppy disk, or a computer disk read only memory (CD-ROM) which is generally slower than primary storage devices 734, 736. Mass memory storage device 738 may take the form of a magnetic or paper tape reader or some other well-known device. It will be appreciated that the information retained within the mass memory device 738, may, in appropriate cases, be incorporated in standard fashion as part of RAM 736 as virtual memory. A specific primary storage device 734 such as a CD-ROM may also pass data uni-directionally to the CPUs 732. Control criteria, exit information, as well as executable code may be loaded from secondary storage to primary storage collection of exit information.

CPUs 732 are also coupled to one or more input/output devices 740 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 732 optionally may be coupled to a computer or telecommunications network, e.g., an internet network or an intranet network, using a network connection as shown generally at 712. With such a network connection, it is contemplated that the CPUs 732 might receive information from the network, or might output information to the network in the course of performing the above-described method steps. Such information, which is often represented as a sequence of instructions to be executed using CPUs 732, may be received from and outputted to the network, for example, in the form of a computer data signal embodied in a carrier wave. The above-described devices and materials will be well appreciated by those of skill in the computer hardware and software arts.

Although only a few embodiments of the present invention have been described, it should be understood that the present invention may be embodied in many other specific forms without departing from the spirit or the scope of the present invention. By way of example, although the steps associated with the various processes and methods of the present invention may be widely varied. In general, the steps associated with the methods may be altered. For instance, the illustrative embodiment described above determines whether a child process is defunct prior to running control criteria. The determination of whether a child process is defunct may instead itself be a control criterion. Alternatively, the determination may be omitted altogether.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed in a variety of operating systems and should not be restricted to the ones mentioned above. Therefore, the scope of the invention should be determined with reference to the appended claims.

What is claimed:

1. A computer-implemented method for a running parent process to collect exit information from a defunct child process associated with the running parent process, the computer-implemented method comprising:
   identifying a running parent process associated with the defunct child process; and
   modifying the running parent process associated with the defunct child process by creating an agent thread side the running parent process, the agent thread being operable to force the running parent process to collect exit information for the defunct child process, thereby enabling the collection of exit information for the defunct child process associated with the running parent process without terminating the running parent process.

2. The computer-implemented method of claim 1, wherein modifying the parent process comprises altering the parent process to invoke wait( ) or waitpid( ).

3. The computer-implemented method of claim 1, wherein a control criterion is used to determine whether to modify the parent process.

4. The computer-implemented method of claim 3, wherein the control criterion comprises determining whether the parent process is stopped.

5. The computer-implemented method of claim 4, wherein the control criterion comprises determining whether the defunct process is a newly defunct process, wherein the parent is modified only if it is determined that the defunct process is not a newly defunct process.

6. The computer-implemented method of claim 4, wherein the control criterion comprises determining that the parent process is not an initial process.

7. A computer-implemented method for reaping a defunct child process associated with a running parent process, the computer-implemented method comprising:
   identifying a defunct child process associated with the running parent process;
   attaching an agent thread to the running parent process to allow modification of the running parent process, wherein the running parent process is modified to reap the defunct child process without terminating the running parent process.

8. The computer-implemented method of claim 7, wherein a control criterion is used to determine whether to modify the parent process.

9. The computer-implemented method of claim 8, wherein the control criterion comprises determining whether the parent process is stopped.

10. The computer-implemented method of claim 8, wherein the control criterion comprises determining whether the defunct process is a newly defunct process, wherein the parent is modified only if it is determined that the defunct process is not a newly defunct process.

11. The computer-implemented method of claim 8, wherein the control criterion comprises determining that the parent process is not an initial process.

12. A computer program product, stored on a machine-readable medium, for a running parent process to collect exit information from a defunct child process associated with the running parent process, the computer program product comprising instructions operable to cause a computer to:
   identify a running parent process associated with the defunct child process; and
   modify the running parent process associated with the defunct child process by creating an agent thread inside the running parent process, the agent thread being operable to force the running parent process to collect exit information for the defunct child process, thereby enabling the collection of exit information for the defunct child process associated with the running parent process without terminating the running parent process.

13. An apparatus for a running parent process to collect exit information from a defunct child process associated with the running parent process, the apparatus comprising:

means for identifying a running parent process associated with the defunct child process; and means for modifying the running parent process associated with the defunct child process by creating an agent thread inside the running parent process, the agent thread being operable to force the running parent process to collect exit information for the defunct child process, thereby enabling the collection of exit information for the defunct child process associated with the running parent process without terminating the running parent process.

14. An apparatus for reaping a defunct child process associated with a running parent process, the apparatus comprising:

memory;

a processor coupled to memory, the processor being configured to:

identify a defunct child process associated with the parent process, and attach an agent thread to the running parent process to allow modification of the running parent process wherein the running parent process is modified to reap the defunct child process without terminating the running parent process.

15. The apparatus of claim 14, wherein a control criterion is used to determine whether to modify the parent process.

16. The apparatus of claim 15, wherein the control criterion comprises determining whether the parent process is stopped.

17. The apparatus of claim 15, wherein the control criterion comprises determining whether the defunct process is a newly defunct process, wherein the parent is modified only if it is determined that the defunct process is not a newly defunct process.

18. The apparatus of claim 15, wherein the control criterion comprises determining that the parent process is not an initial process.

* * * * *